(12) United States Patent
Yeh

(10) Patent No.: US 9,971,234 B2
(45) Date of Patent: May 15, 2018

(54) COOLING DEVICE AND PROJECTOR USING THE SAME

(71) Applicant: HON HAI PRECISION INDUSTRY CO., LTD., New Taipei (TW)

(72) Inventor: Chin-Wen Yeh, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 194 days.

(21) Appl. No.: 15/208,614

(22) Filed: Jul. 13, 2016

(65) Prior Publication Data

US 2017/0371233 A1    Dec. 28, 2017

(30) Foreign Application Priority Data

Jun. 23, 2016  (CN) .......................... 2016 1 0461928

(51) Int. Cl.
  *G03B 21/16*  (2006.01)
  *G03B 21/20*  (2006.01)
(52) U.S. Cl.
  CPC ......... *G03B 21/16* (2013.01); *G03B 21/2093* (2013.01)

(58) Field of Classification Search
  CPC .. G03B 21/16; G03B 21/2093; H04N 9/3144; H04N 9/3141
  See application file for complete search history.

(56) References Cited

U.S. PATENT DOCUMENTS

| | | | | | |
|---|---|---|---|---|---|
| 2,229,760 | A | * | 1/1941 | Mueller | G03B 21/16 353/61 |
| 2,303,633 | A | * | 12/1942 | Guercio | G03B 1/56 353/57 |
| 3,122,330 | A | * | 2/1964 | Trentini | G03B 21/16 362/261 |
| 3,523,724 | A | * | 8/1970 | Freeman | G03B 21/2013 352/202 |

* cited by examiner

*Primary Examiner* — William C Dowling
(74) *Attorney, Agent, or Firm* — ScienBiziP, P.C.

(57) ABSTRACT

A cooling device for an emitting module of a projector includes a base, a guiding portion installed on the base, and a latch portion installed on the base. The guiding portion includes a positioning plate secured on one side of the base and a guiding plate secured on the other side of the base. The positioning plate and the guiding plate are foldable relative to the base to be connected with each other and so define an inlet channel. Air flow can pass through the inlet channel to cool the emitting module. The latch portion is configured to form an outlet in different directions to adjust a direction and strength of the air flow.

20 Claims, 6 Drawing Sheets

COOLING DEVICE AND PROJECTOR USING THE SAME

FIELD

The subject matter herein generally relates to cooling devices, and more particularly to a cooling device for a projector.

BACKGROUND

Projectors are widely used. A lamp bulb of an emitting module is a main heat source in the projector. The high temperature of the lamp bulb will not only affect the performance and service life of the emitting module, the performance of other components of the projector can also be affected.

BRIEF DESCRIPTION OF THE DRAWINGS

Implementations of the present technology will now be described, by way of example only, with reference to the attached figures.

DETAILED DESCRIPTION

Figure 1:
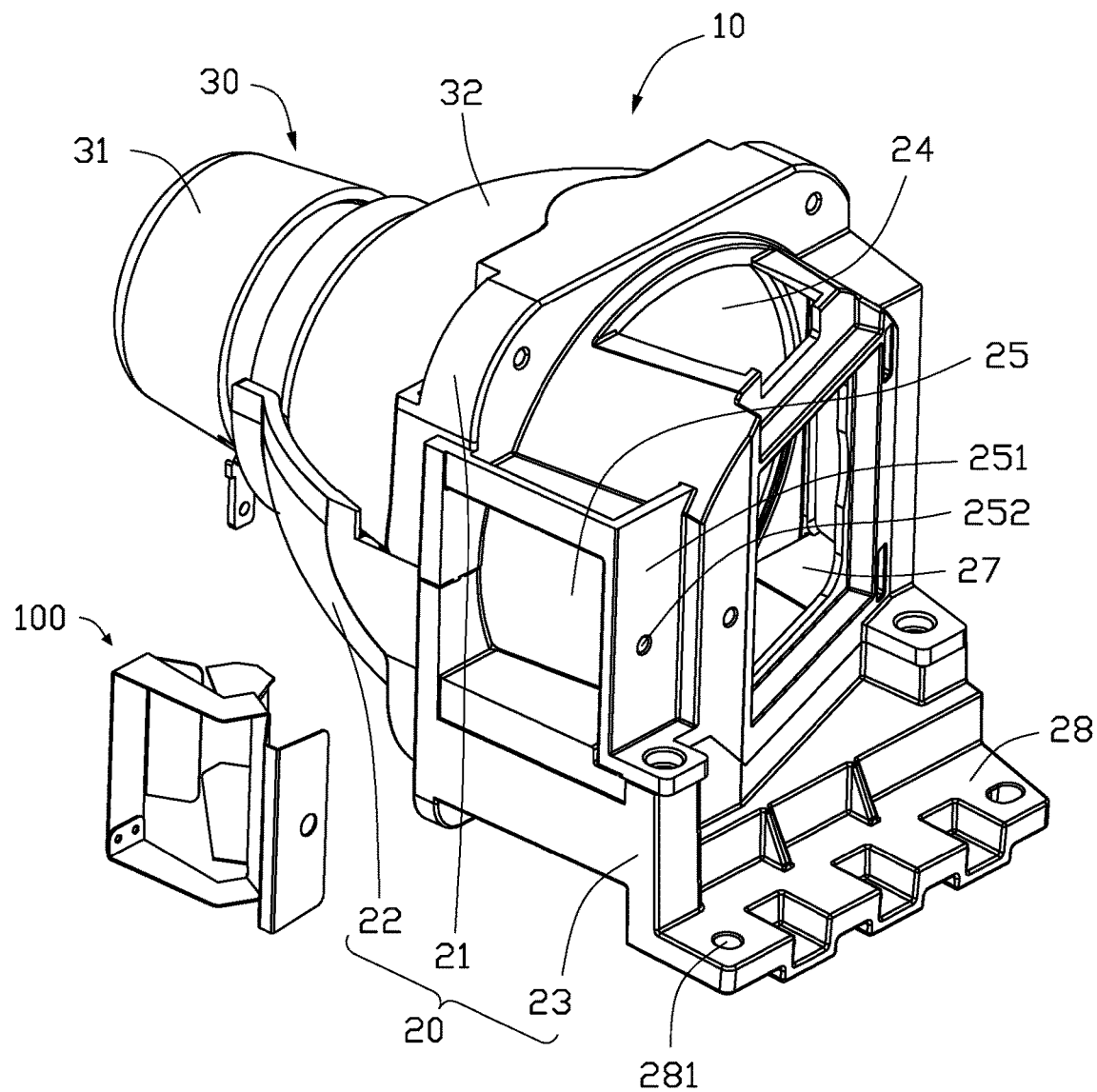
FIG. 1 is an exploded, isometric view of an embodiment of a cooling device and an emitting module.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "outside" refers to a region that is beyond the outermost confines of a physical object. The term "inside" indicates that at least a portion of an object is contained within a boundary formed by another object. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series and the like.

FIG. 1 illustrates one embodiment of a cooling device 100 installed in an emitting module 10 of a projector (not shown). The emitting module 10 includes a supporting base 20 and an emitting device 30 received in the supporting base 20. In at least one embodiment, the cooling device 100 is made by integral molding.

The supporting base 20 includes a bracket 21, a pallet 22 secured to one side of the bracket 21, and a housing 23 secured to the other side of the bracket 21. The bracket 21 defines a gap and the emitting device 30 can be installed in the gap. The pallet 22 extends outwards from one side of the bottom end of the bracket 21. The pallet 22 can fit on the bottom of the emitting device 30 to support the emitting device 30. The housing 23 extends outwards from the other side of the bracket 21. A receiving space 24 is defined within the housing 23, and the emitting device 30 can be received in the receiving space 24.

An air inlet 25 and an air outlet (shown in FIG. 6) are defined on each side of the housing 23. The air inlet 25 and the air outlet 26 both communicate with the receiving space 24. Airflow is configured to enter into the receiving space 24 via the air inlet 25, and be discharged out the receiving space 24 via the air outlet 26, to cool the emitting device 30. One side of the air inlet 25 is equipped with a limiting plate 251. The limiting plate 251 defines a securing hole 252, and the cooling device 100 is configured to be secured on the limiting plate 251. A front end of the housing 23 defines an opening (shown in FIG. 7) communicating with the receiving space 24. The light from the emitting device 30 can pass through the opening 27 to the outside. The bottom of the housing 23 includes a mounting plate 28, and a plurality of mounting holes 281 are defined on the mounting plate 28. A plurality of securing members (not shown) is configured to pass through the mounting holes 281 to secure the supporting base 20 in the projector.

The emitting device 30 includes a connecting portion 31, a lampshade 32, and a lamp bulb 33 received in the lampshade 32. The connecting portion 31 is connected to a cable (not shown) with the lamp bulb 33. The lampshade 32 is secured on the connecting portion 31 and received in the gap of the bracket 21. The lampshade 32 defines an accommodating portion, and an outside surface of the accommodating portion is fitted with the pallet 22. An inside surface of the accommodating portion is substantially a paraboloid. The lamp bulb 33 is received in the accommodating portion and electrically connected with the connecting portion 31. The paraboloid of the accommodating portion can reflect the light from the lamp bulb 33.

Figure 2:
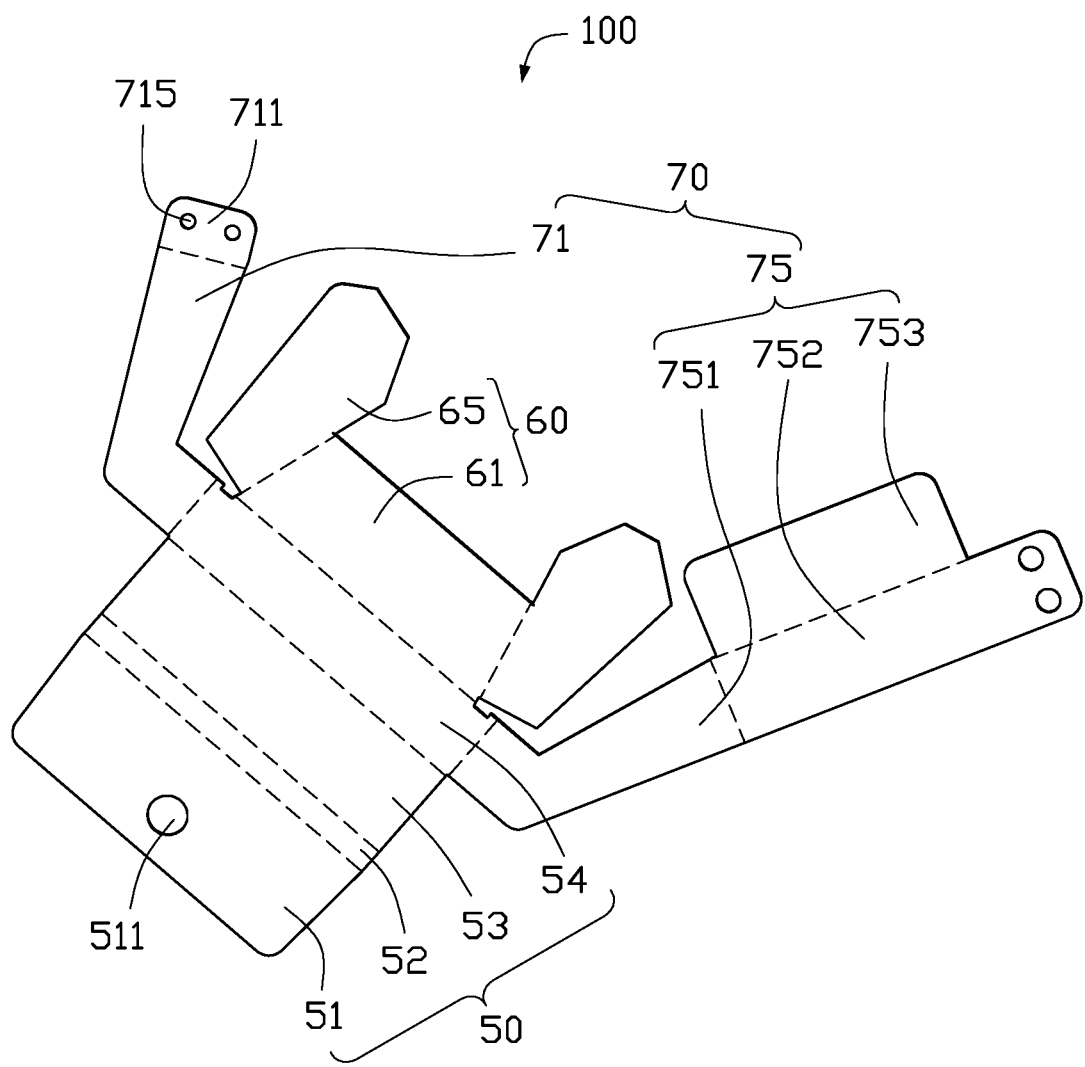
FIG. 2 is a view of the unfolded cooling device of FIG. 1.
Figure 3:
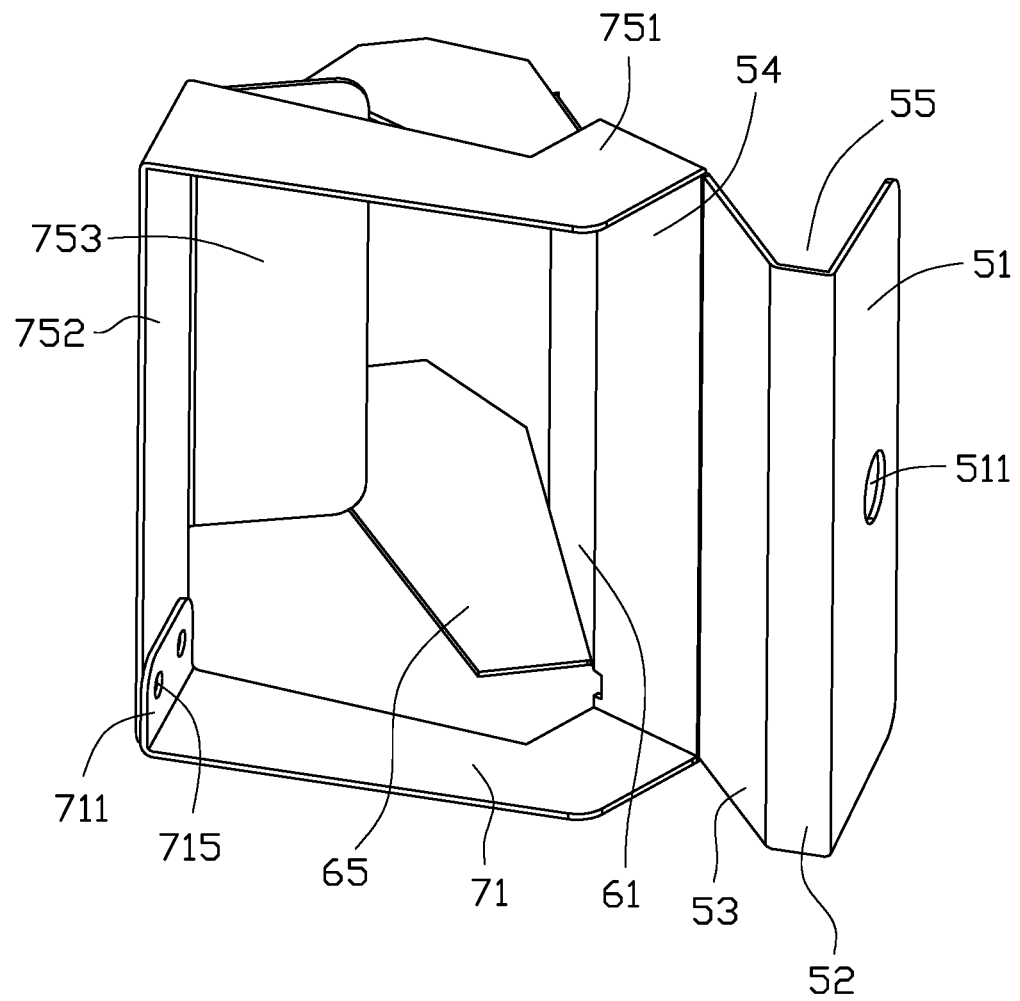
FIG. 3 is an assembled, isometric view of the cooling device of FIG. 2.
Figure 4:
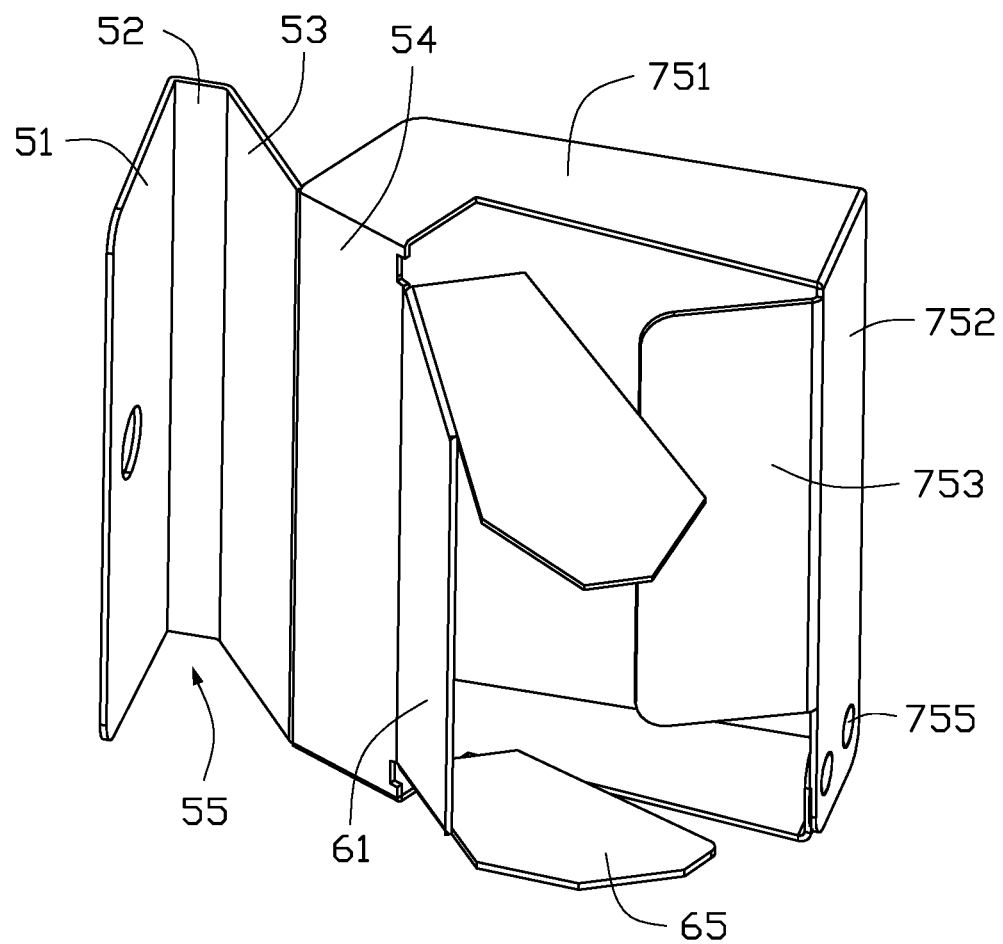
FIG. 4 is similar to FIG. 3, but viewed from another angle.

FIGS. 2 to 4 illustrate that the cooling device 100 includes a base 50, a latch portion 60 secured on the base 50, and a guiding portion 60 secured on the base 50. The base 50 includes a first plate 51, a second plate 52 connected with the first plate 51, a third plate 53 connected with the second plate 52, and a forth plate 54 connected with the third plate 53. The first plate 51 defines a securing hole 511, and a securing member (not shown) can pass through the securing hole 511 and be inserted into the securing hole 252 of the limiting plate 251 to secure the base 50 on the emitting module 10. The second plate 52 can bend to different angles relative to the first plate 51, the third plate 53 can bend to different angles relative to the second plate 52, and the fourth plate 54 can bend to different angles relative to the third plate 53. The first plate 51, the second plate 52, and the third plate 53 cooperatively define a slot 55 after bending. The limiting plate 251 is configured to be inserted into the slot 55.

The latch portion 60 includes a connecting plate 61 connected with the fourth plate 54 and baffles 65 located on each side of the connecting plate 61. The connecting plate 61 can bend to different angles relative to the fourth plate 54. The baffles 65 can be folded to different angles relative to the connecting plate 61 to change the forward direction of the air flow.

The guiding portion 70 includes a positioning plate 71 connected with one side of the fourth plate 54 and a guiding plate 75 connected with the other side of the fourth plate 54. A securing plate 711 is located on one side of the positioning plate 71, away from the fourth plate 54. The securing plate 711 can be folded to different angles relative to the fourth plate 54. The securing plate 711 defines two connecting holes 715.

The guiding plate 75 includes an adapter plate 751, a closing plate 752 connected to the adapter plate 751, and a splitter plate 753 extending outwards from a side of the closing plate 752. The adapter plate 751 can be folded to different angles relative to the fourth plate 54, the closing plate 752 can be folded to different angles relative to the adapter plate 751, and the splitter plate 753 can be folded to different angles relative to the closing plate 752.

A plurality of connecting holes 755 is defined in a side of the closing plate 752 away from the adapter plate 751. The closing plate 752 can be folded inwards to connect with the securing plate 711 to define an inlet channel, the air flow can enter into the receiving space 24 via the inlet channel. Two securing members (not shown) are configured to be inserted into the connecting holes 715 and the connecting holes 755 to secure the securing plate 711 on the closing plate 752.

Figure 5:
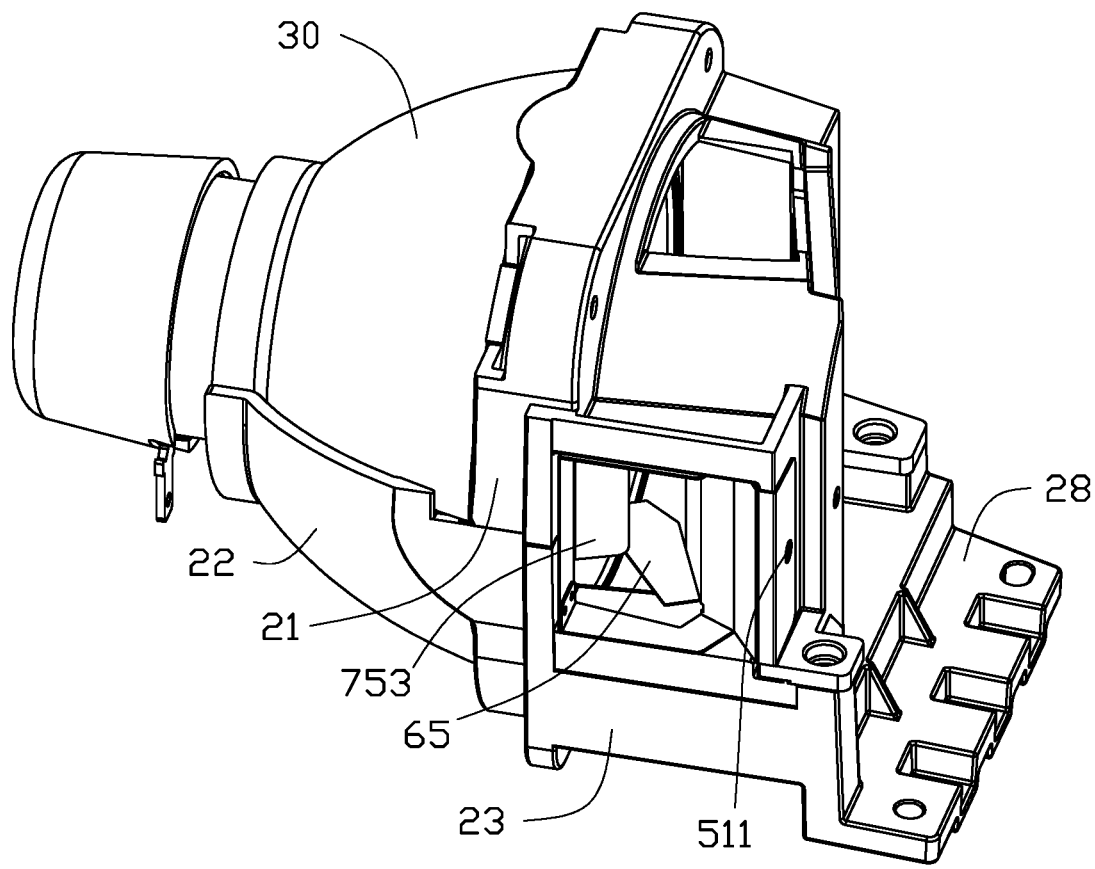
FIG. 5 is an assembled, isometric view of the cooling device and the emitting module of FIG. 1.
Figure 6:
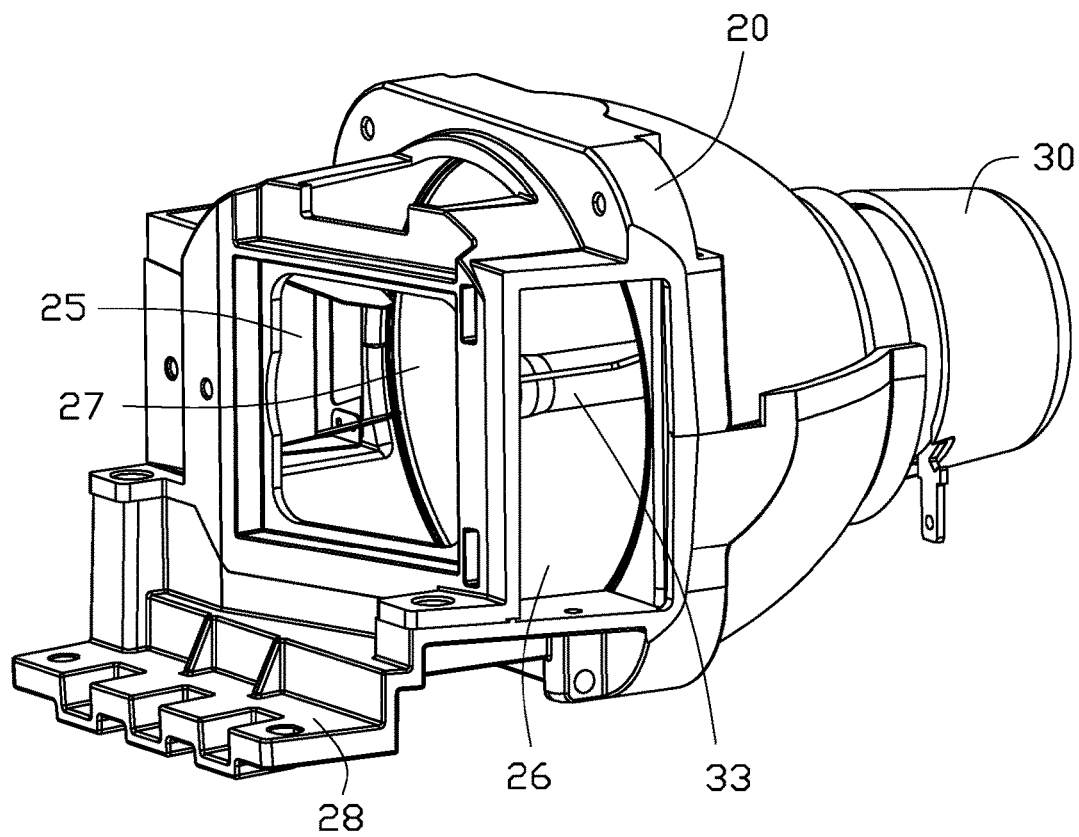
FIG. 6 is similar to FIG. 5, but viewed from another angle.

FIGS. 5 and 6 illustrate that in assembly the second plate 52 is folded inwards relative to the first plate 51 and the third plate 53 is bent relative to the second plate 52 to define the slot 55. The fourth plate 54 is bent to a certain angle relative to the third plate 53 and the connecting plate 61 is bent to a certain angle relative to the fourth plate 54 to guide the air flow to the emitting device 30. The two baffles 65 are bent to a certain angle relative to the connecting plate 61 to be substantially parallel to each other.

The positioning plate 71 is bent to a certain angle relative to the fourth plate 54 to be substantially perpendicular to the fourth plate 54. The adapter plate 751 is bent to a certain angle relative to the fourth plate 54 to be substantially perpendicular to the fourth plate 54. The closing plate 752 is bent to a certain angle relative to the adapter plate 751 to be substantially perpendicular to the adapter plate 751. The splitter plate 753 is bent to a certain angle relative to the closing plate 752 to guide the air flow to the emitting device 30. The securing plate 711 is bent so as to fit with the closing plate 752. The connecting hole 715 is aligned with the connecting hole 755. The securing member is inserted into the connecting hole 715 and the connecting hole 755 to secure the securing plate 711 on the closing plate 752. The cooling device 100 is thus assembled completely.

The emitting device 30 is installed on the supporting base 20 and the cooling device 100 is located on the air inlet 25. The limiting plate 251 is inserted into the slot 55. The first plate 51 is fitted on the limiting plate 251. The securing hole 252 is aligned with the securing hole 511. The securing member passes through the securing hole 511 and is inserted into the securing hole 252 to secure the cooling device 100 on the supporting base 20. The baffles 65 and the splitter plate 753 are received in the receiving space 24.

When the emitting module 10 is working, the air flow enters into the receiving space 24 via the inlet channel, and is directed onto the emitting device 30 under the guidance of the baffles 65 and the splitter plate 753. The air flow discharges out the receiving space 24 via the air outlet 26 to dissipate heat from the emitting device 30. The magnitude and direction of the airflow can be adjusted by changing the bending angles of the baffles 65 and the splitter plate 753.

The embodiments shown and described above are only examples. Many details are often found in the art such as the other features of a cooling device and a projector using the same. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A cooling device configured to be installed in an emitting module of a projector, comprising:
   a base;
   a guiding portion installed on the base and comprising a positioning plate secured on one side of the base and a guiding plate secured on the other side of the base; and
   a latch portion installed on the base;
   wherein each of the positioning plate and the guiding plate is foldable relative to the base to be connected with each other to define an inlet channel such that an air flow can pass through the inlet channel to cool the emitting module, the latch portion is configured to form an outlet in different directions to adjust a direction of the air flow.

2. The cooling device of claim 1, wherein the base comprises a first plate, the first plate defines a securing hole, a securing member can pass through the securing hole and be inserted into the emitting module to secure the cooling device to the emitting module.

3. The cooling device of claim 2, wherein the base further comprises a second plate connected with the first plate and a third plate connected with the second plate, the first plate, the second plate and the third plate are foldable relative to each other to define a slot, the emitting module comprises a limiting plate, and the limiting plate is inserted into the slot.

4. The cooling device of claim 3, wherein the base further comprises a forth plate connected with the third plate, the latch portion and the guiding portion are both secured on the forth plate.

5. The cooling device of claim 4, wherein the latch comprises a connecting plate connected with the forth plate, the connecting plate is foldable in different angles relative to the forth plate.

6. The cooling device of claim 1, wherein the latch portion further comprises two baffles respectively secured on two sides of the connecting, the two baffles are folded indifferent angles relative to the connecting plate to adjust the direction of the air flow.

7. The cooling device of claim 1, wherein the guiding plate comprises an adapter plate connected with one side of the base, and the adapter plate is folded in different angles relative to the base.

8. The cooling device of claim 7, wherein the further guiding plate comprises a closing plate connected with the adapter plate, and the closing plate is folded in different angles relative to the adapter plate.

9. The cooling device of claim 8, wherein one end away from the adapter plate of the closing plate defines a plurality of connecting holes, the positioning plate is defined a plurality of connecting holes, when the closing plate is connected with the adapter plate, the connecting holes of the closing plate are aligned with the connecting holes, a plurality of securing member can be inserted into the connecting holes to connect the closing plate with the positioning plate.

10. The cooling device of claim 9, wherein the guiding plate further comprises a splitter plate secured on one side of the closing plate, the splitter plate can bend different angles relative to the closing plate to adjust the direction of the air flow.

11. A projector comprising:
an emitting module; and
a cooling device configured to be installed in the emitting module comprising:
   a base;
   a guiding portion installed on the base comprising a positioning plate secured on one side of the base and a guiding plate secured on the other side of the base; and
   a latch portion installed on the base:
wherein the positioning plate and the guiding plate are both configured to bend relative to the base to be connected with each other to define an inlet channel, the air flow can pass through the inlet channel to cool the emitting module, the latch portion is configured to form an outlet in different directions to adjust a direction of the air flow.

12. The projector of claim 11, wherein the base comprises a first plate, the first plate defines a securing hole, a securing member can pass through the securing hole and be inserted into the emitting module to secure the cooling device to the emitting module.

13. The projector of claim 12, wherein the base further comprises a second plate connected with the first plate and a third plate connected with the second plate, the first plate, the second plate and the third plate are foldable relative to each other to define a slot, the emitting module comprises a limiting plate, and the limiting plate is inserted into the slot.

14. The projector of claim 13, wherein the base further comprises a forth plate connected with the third plate, the latch portion and the guiding portion are both secured on the forth plate.

15. The projector of claim 14, wherein the latch comprises a connecting plate connected with the forth plate, the connecting plate is foldable in different angles relative to the forth plate.

16. The projector of claim 11, wherein the latch portion further comprises two baffles respectively secured on two sides of the connecting, the two baffles are folded indifferent angles relative to the connecting plate to adjust the direction of the air flow.

17. The projector of claim 11, wherein the guiding plate comprises an adapter plate connected with one side of the base, and the adapter plate is folded in different angles relative to the base.

18. The projector of claim 17, wherein the further guiding plate comprises a closing plate connected with the adapter plate, and the closing plate is folded in different angles relative to the adapter plate.

19. The projector of claim 18, wherein one end away from the adapter plate of the closing plate defines a plurality of connecting holes, the positioning plate is defined a plurality of connecting holes, when the closing plate is connected with the adapter plate, the connecting holes of the closing plate are aligned with the connecting holes, a plurality of securing member can be inserted into the connecting holes to connect the closing plate with the positioning plate.

20. The projector of claim 19, wherein the guiding plate further comprises a splitter plate secured on one side of the closing plate, the splitter plate can bend different angles relative to the closing plate to adjust the direction of the air flow.

* * * * *